United States Patent [19]

Slovak et al.

[11] Patent Number: 4,871,893

[45] Date of Patent: Oct. 3, 1989

[54] SLIDE CONTROL SWITCH

[75] Inventors: Michael J. Slovak; Raymond T. Griffin, both of San Antonio, Tex.; Steven R. Carson, Upper Saddle River, N.J.

[73] Assignee: Lightolier, Inc., Secaucus, N.J.

[21] Appl. No.: 226,077

[22] Filed: Jul. 29, 1988

[51] Int. Cl.⁴ .................... H01H 15/00; H02G 13/14; H05K 15/03
[52] U.S. Cl. .................................... 200/16 R; 174/66
[58] Field of Search ................. 174/66, 67; 200/16 R, 200/16 B, 16 C, 16 D, 17 R, 11 DA, 292, 302.1, 329, 345, 547, 551, 573; 220/241, 242; 361/331-334; 338/178, 179, 198, 200, 215

[56] References Cited

U.S. PATENT DOCUMENTS

| | | | |
|---|---|---|---|
| 2,870,273 | 1/1959 | Merchant | 200/16 R X |
| 2,900,460 | 8/1959 | Wallace | 200/551 X |
| 3,562,464 | 2/1971 | Vollum et al. | 200/292 X |
| 3,719,788 | 3/1973 | Holland et al. | 200/292 X |
| 3,770,921 | 11/1973 | Wilbrecht | 200/551 |
| 4,008,419 | 2/1977 | Stearley | 174/66 X |
| 4,096,365 | 6/1978 | Hodell | 200/11 DA |
| 4,331,844 | 5/1982 | Saitoh | 200/551 X |
| 4,507,627 | 3/1985 | Ito et al. | 200/16 R |
| 4,742,188 | 5/1988 | Buehler et al. | 200/16 R |

Primary Examiner—J. R. Scott

[57] ABSTRACT

A slide-type switch for controlling electrical output to a light or motor. The switch includes a printed circuit board having a sliding variable resistor mounted thereon. When the variable resistor is adjusted for minimum current flow, the slide on the variable resistor comes into contact with an actuator arm also mounted on the printed circuit board. The actuator arm then becomes detached from a butt contact, breaking the circuit. A novel knob arrangement is also disclosed for use with standard all face plates.

3 Claims, 2 Drawing Sheets

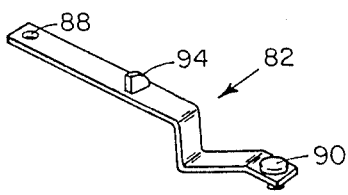
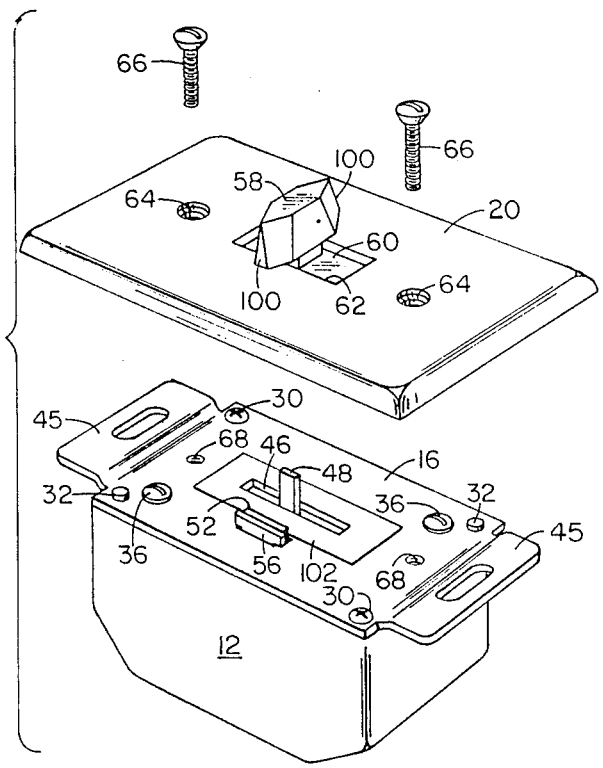
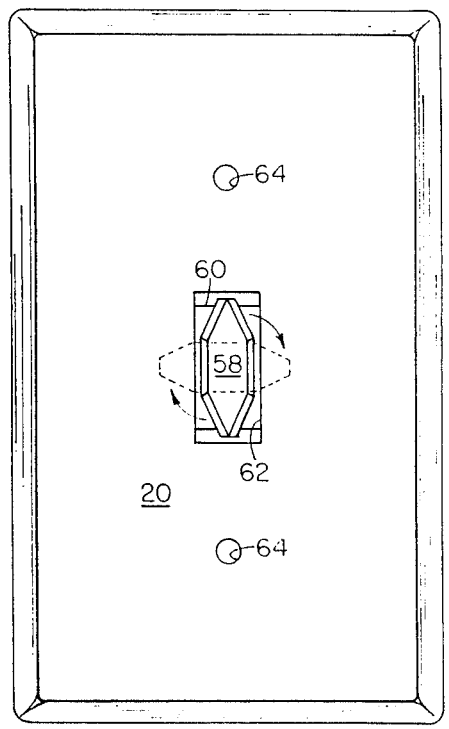
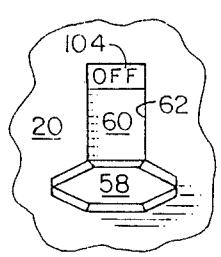
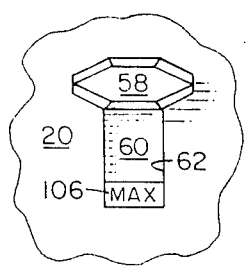
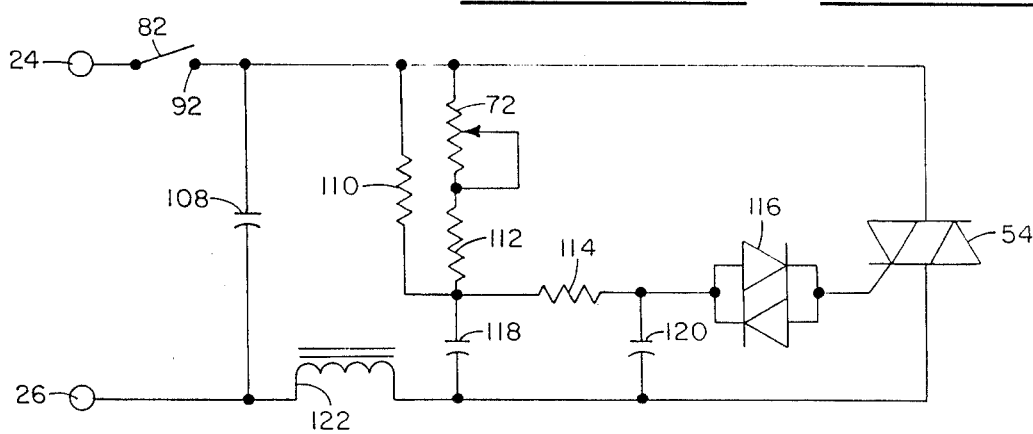

SLIDE CONTROL SWITCH

BACKGROUND OF THE INVENTION

1. Field of the Invention

The present invention generally relates to control switches, and more particularly to a slide-type switch intended for use as a light dimmer control.

2. Description of the Prior Art

Power switches are manufactured in all shapes and sizes for a sundry of different purposes. The present invention is directed to a particular power switch which, although intended for use as a light dimmer, could be used with motors and in other applications. The simplest electrical switches of the type referred to herein generally consist of two or more wires for connection to an external power source, a pair of metal contacts connected to these wires, and a lever or button used to actuate the contacts betweeen open and closed states.

There are several different types of light switches. These include knife switches, mercury switches, turnstile type switches, tumbler switches, push-button switches and electromagnetic switches, all familiar to those skilled in the art. A network of lights may be managed by a single rotary power switch having a plurality of contacts. For light dimming circuits, early switches incorporated a rheostat or potentiometer for regulating the power transmitted to the light bulb. Modern dimmers use a triac firing circuit which generates considerably less heat and power loss than the older potentiometer configuration, although a variable resistor is still employed to adjust the firing range of the triac.

Several problems arise in the manufacture, installation, and use of dimmer switches. One such problem occurs in slide-type dimmers. The slide knob extends outward from the internal mechanisms of the switch, leaving an unsightly gap which peers inside the device. This relates to the manner in which the knob is coupled to the internal potentiometer. Another problem concerns the full 'off' setting in a triac firing circuit. Rather than completely shutting off current flow for the full 'off' setting, some circuits merely use the triac as a gate, resulting in excessive heat loss, which can further cause short circuits or other failure. Finally, the switch manufacturer must often fabricate a special face plate to accomodate the slide knob, which typically does not conform to standard wall switch face plates. This increases the cost of production of the unit and, consequently, the total cost to the consumer.

It would, therefore, be desirable and advantageous to devise a light switch which has an improved linkage between the slide knob and the internal circuitry, as well as including in the linkage means to totally disconnect the power supply for 'full off'. The switch should also be adaptable to standard wall face plates.

SUMMARY OF THE INVENTION

Accordingly, the primary object of the present invention is to provide a slide-type power control switch.

Another object of the invention is to provide such a switch which may be used with standard wall face plates designed for lever-type switches.

Still another object of the invention is to provide control switch wherein the slide knob includes means to conceal the internal mechanisms of the switch or, alternatively, allows only viewing of an internally mounted decal or the like to indicate power output.

Yet another object of the invention is to provide a slide-type light dimmer switch having 'full off' capability.

The foregoing objects are achieved in a slide control switch having a slide knob integral with a baffle plate, the knob being of appropriate size and shape to be inserted through the hole of a standard face plate. The knob is coupled to a variable resistor within the housing of the switch in such a manner that, when pushed to its off position, a linkage opens an air gap contact cutting off all power to the switch.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjuction with the accompanying drawings, wherein:

FIG. 4 is a perspective view of the actuator arm shown in FIG. 3B.

FIGS. 5A and 5B depict the manner in which the slide knob is inserted into a standard face plate and then attached to the control switch.

FIGS. 6A and 6B show the use of the decal visible through the cutout in the face plate.

FIG. 7 is a schematic diagram of the electrical circuitry in the preferred embodiment of the present invention.

DESCRIPTION OF THE PREFERRED EMBODIMENTS

Figure 1:
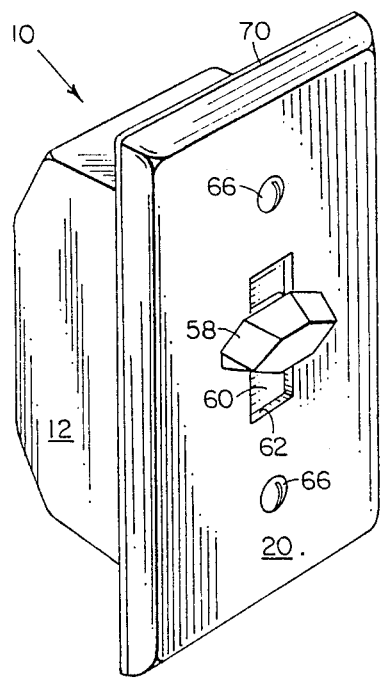
FIG. 1 is a perspective view of the slide control switch of the present invention.
Figure 2:
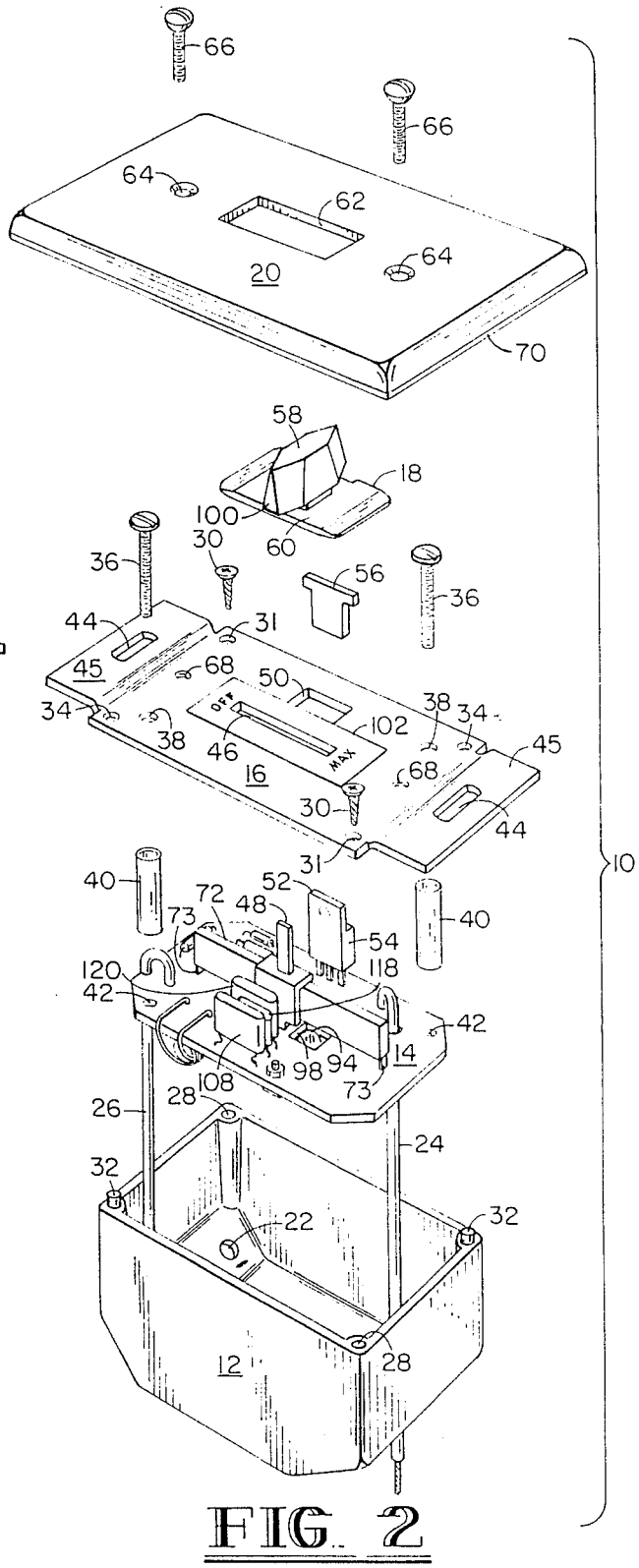
FIG. 2 is an exploded perspective view of the present invention.

With reference now to the figures, and in particular with reference to FIGS. 1 and 2, there is depicted a slide control switch 10. Slide control switch 10 is generally comprised of housing 12, printed circuit board 14, strap 16, slide knob 18, and face plate 20. Housing 12 is simply a hard plastic box designed to protect the internal elemetns of slide control switch 10. It is usually rectangular in shape, and has a plurality of apertures 22 in its lower wall for ventilation, and to allow exit of power supply wires 24 and 26. Housing 12 also typically has one or more holes 28 for receiving screws 30 which extend through holes 31 in strap 16, securing strap 16 to housing 12. Housing 12 may further be provided with dowels 32 which mate with holes 34 in strap 16, further facilitating assembly of switch 10.

Printed circuit board (PCB) 14 is used as a substrate for mounting the various electrical components of slide control switch 10. The specific electrical components used for control switch 10 are not relevant to the present application, but one embodiment is discussed below in conjunction with FIG. 7. PCB 14 resides within housing 12, and is attached to strap 16 by means of screws 36, which extend through holes 38 in strap 16, spacers 40, and holes 42 in PCB 14. Spacers 40 maintain a proper clearance between strap 16 and PCB 14. PCB 14 typically has two wires 24 and 26 attached thereto for connection to mains power supply. A third wire (not shown) may be included for grounding, or for three-way connection.

Strap 16 is preferably metallic, and is used to secure the entire slide control switch 10 to an electrical supply box already mounted in the wall. Screws (not shown) are usually placed through two apertures 44 on end wing portions 45 of strap 16 to secure the same to the supply box. In addition to the aforementioned holes and apertures in strap 16, there is also a slot 46 which allows passage of shaft 48 therethrough. Shaft 48 is connected to slide knob 18, and is discussed further below in conjunction with FIGS. 3A and 3B. Strap 16 may also serve as a heat sink for certain electrical components. For example, a larger slot 50 may be provided which accomodates a heat sink 52 on triac 54. In the preferred embodiment, a metallic wedge 56 is used to firmly secure heat sink 52 within slot 50.

Slide knob 18 consists of two parts, knob member 58 and baffle plate 60. Knob member 58 and baffle plate 60 are preferably integral, the entire slide knob 18 being injection molded plastic. Baffle plate 60 has a slot on its rear side (not shown) for receiving shaft 48. Slide knob 18 is discussed further below in conjunction with FIGS. 5A, 5B, 6A, and 6B.

Face plate 20 is a standard switch face plate, i.e., it has a cutout 62 which is typically designed to receive a lever-type switch which is standard in most commercial and residential light switches. This is significant in that manufacturing and packaging costs may be reduced where slide control switch 10 replaces such lever-type switches, since a standard face plate 20 will already be present and need not be included in the product package. Face plate 20 usually has two orifices 64 for receiving screws 66 which secure face plate 20 to strap 16 at holes 68. The edges 70 of face plate 20 may be beveled for a more pleasing appearance.

Figure 3A:
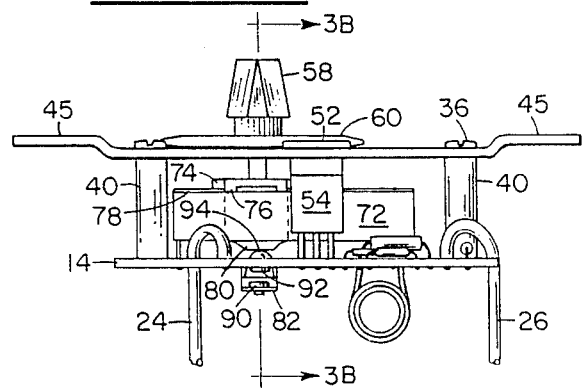
FIG. 3A is a side view of the slide control switch with the housing removed, showing the interconnection of the slide knob, the slide member, and the air gap actuator arm.
Figure 3B:
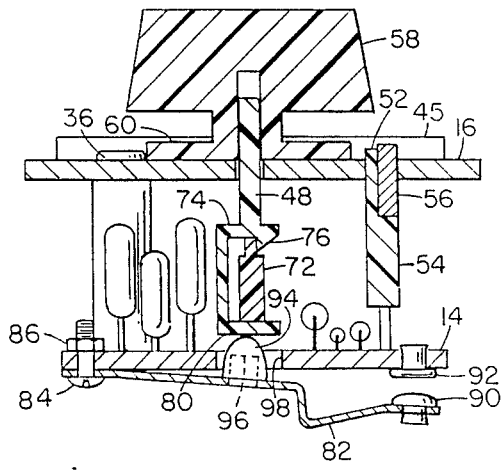
FIG. 3B is a cross-sectional view of the internal features of the present invention taken along lines 3B—3B of FIG. 3A.

With reference now to FIGS. 3A and 3B, the air gap feature of the present invention is explained. As previously noted, most dimmer switches, as well as motor controls, utilize some type of variable resistor, here designated by reference numeral 72. Variable resistors may be rotary style, but the present invention is directed to a variable resistor 72 having a slide member 74 which travels longitudinally along variable resistor 72. Slide member 74 typically has a pair of electrical contacts (not shown) which shunt across resistive conducting tracks (also not shown) on variable resistor 72. Shaft 48 is attached to and integral with slide member 74, whereby movement of knob member 58 cause slide member 74 to glide along variable resistor 72. Variable resistor 72 is mounted to PCB 14 only at its distal ends 73.

The cross-section of slide member 74 is somewhat C-shaped, facilitating attachment to variable resistor 72. The upper edge of this C-shape forms a lip 76 which rides along an indented track 78 on variable resistor 72. The bottom portion of slide member 74 forms a boss 80 which interacts with a metallic actuator arm 82. Actuator arm 82, which is shown more clearly in FIG. 4, is attached to PCB 14 by means of a small screw 84 and nut 86, screw 84 passing through hole 88 in actuator arm 82. In its relaxed state, actuator arm 82 lies generally flat against the underside of PCB 14, and its distal end 90 is forcibly urged against butt contact 92 attached to PCB 14.

A small bump 94 is conveniently formed on actuator arm 82 by cutting small holes 96 in actuator arm 82 and inserting arm 82 into a mold, followed by injecting plastic into the mold to create bump 94. Bump 94 is thereby integral with a plastic flange (not shown) on the underside of arm 82, holding bump 94 in place. Of course, bump 94 could be formed simply by bending actuator arm 82 appropriately. Bump 94 may contact boss 80 by means of a hole 98 cut in PCB 14. Thus, when slide member 74 passes over actuator arm 82, boss 80 contacts bump 94, forcing distal end 90 away from butt contact 92, breaking the power supply circuit. It is highly desirable to have such a 'full off' condition for both safety and economic reasons.

As explained above, slide control switch 10 is designed to be used with a standard face plate 20. The cutout 62 in such face plates, however, is typically rather small, about one centimeter by two and one-half centimeters. When designing slide control switch 10, the inventors realized that any knob capable of passing through such a small opening would itself be so small that it might be difficult to manipulate. Because of this, knob member 58 was designed whereby it may fit through cutout 62, and then be turned 90 degrees so as to provide a longer horizontal surface which is easier to grip.

As shown in FIG. 5A, after slide control switch 10 is otherwise assembled, knob member is passed through cutout 62, and then rotated. This also assists in attaching face plate 20 to slide control switch 10 since, once knob member 58 is in its proper orientation, it effectively has flanged portions 100 which hold face plate 20 tightly against strap 16. Alternatively, before slide knob 18 is attached to shaft 48, knob member 58 may be placed in cutout 62, rotated, and then slide knob 18 and face plate 20 can both be lowered onto the rest of slide control switch 10, making sure that shaft 48 enters the slot on the rear side of baffle plate 60. This technique is depicted in FIG. 5B. Of course, for flanged portions 100 to be useful, they must be slightly longer than the width of cutout 62, i.e., one centimeter.

FIG. 5B also shows one final feature of the invention alluded to above. This concerns decal 102. As mentioned in the Summary of the Invention, an object of the present invention is to provide a control switch wherein slide knob 18 includes means (60) to conceal the internal mechanisms of the switch or, alternatively, to allow only viewing of an internally mounted decal or the like to indicate power output. To achieve the former goal, baffle plate 60 merely has to be longer than cutout 62. However, if baffle plate 60 is slightly shorter than cutout 62, whereby a small space is left at the top or bottom of cutout 62 depending on the relative location of slide knob 18, then decal 102 may be utilized to so indicate power output. This is further illustrated in FIGS. 6A and 6B.

FIG. 6A shows slide knob 18 pushed to its lowest position. This position corresponds to FIGS. 3A and 3B wherein boss 80 is contacting bump 94, completely shutting off the power supply to slide control switch 10. In this position, the upper portion 104 of decal 102 peeks through cutout 62 to reveal the word 'OFF.' FIG. 6B shows slide knob 18 at its uppermost position, corresponding to maximum current flow through variable resistor 72. In this position, the lower portion 106 of decal 102 displays the word 'MAX' through cutout 62. Of course, care must be taken that decal 102 is placed in the proper alignment during assembly.

Referring now to FIG. 7, an electrical schematic of the components mounted on PCB 14 is depicted. As noted above, this figure is not meant to be limiting; it is merely the best mode of electrical configuration as contemplated by the inventors. Wire 24 provides main power to slide control switch 10. This is preferably immediately connected to actuator arm 82 (at screw 84). A capacitor 108 is supplied to smooth power surges. Trimming resistors 110, 112, and 114, along with variable resistor 72, provide control for diac 116, which in turn control triac 54. Capacitors 118 and 120 acts as filters to the input of diac 116, as well as smoothing the waveform. Inductor 122 similarly reduces abberations in the power supply. Wire 26 leads to the light source to be illuminated, and a third wire (not shown) connects the opposite pole to the mains power. For further details of the circuitry required for power limiting switches, attention is directed to U.S. Patent No. 4,087,702 entitled 'Digital Electronic Dimmer,' and U.S. Patent No. 4,408,150 entitled 'Speed Control System and Method for Electric Motor,' which are both hereby incorporated by reference.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. For example, while the inventors anticipate primary use of this device in controlling lighting fixtures, it has clear application to other electrical systems, such as electric motors. It is therefore contemplated that the appended claims will cover such modifications that fall within the true scope of the invention.

I claim:

1. An electrical control switch for providing from an external power source a variable power input comprising:

housing means, a printed circuit board including a fixed contact located in said housing means;

control circuit mounted within said housing means and at least partially mounted on said printed circuit board, said control circuit providing said variable power output and including:
   (a) a linearly actuated device mounted on said printed circuit board;
   (b) a slide member boss on said linearly actuated device; and
   (c) an actuator contact arm mounted on said printed circuit board, said actuator contact arm engaging said slide member boss to move said actuator contact arm into and out of contact engagement with said fixed contact thereby connecting said external power source to said control circuit;

a strap enclosing said housing means and having mounting means for electrical control switch thereon;

a slide knob with a baffle plate for moving parallel to said strap, said slide member engaging said slide knob through said strap for slidable movement of said slide knob and said slide member; and a face plate over said strap with said slide knob extending therethrough, said face plate holding said said slide knob in engagement with said slide member.

2. The electrical control switch for providing variable power output as recited in claim 1 wherein said face plate has a generally oblong cutout therein, said slide knob being generally oblong and being sufficiently small to pass through said generally oblong cutout, but not said baffle plate, so that upon rotation of said face plate to its final fixed position with respect to said slide knob said slide knob is held in position.

3. The electrical control switch for providing variable power output as recited in claim 2 wherein said baffle plate is positioned between said strap and said face plate.

* * * * *